United States Patent [19]
Dietsche

[11] Patent Number: 4,831,678
[45] Date of Patent: May 23, 1989

[54] CLEANING TOOL
[75] Inventor: Alfons Dietsche, Todtnau-Aftersteg, Fed. Rep. of Germany
[73] Assignee: Roman Dietsche KG, Todtnau-Aftersteg, Fed. Rep. of Germany
[21] Appl. No.: 177,464
[22] Filed: Apr. 4, 1988
[30] Foreign Application Priority Data
    Apr. 9, 1987 [DE] Fed. Rep. of Germany ....... 3712036
[51] Int. Cl.⁴ ............................................... A46B 9/02
[52] U.S. Cl. ..................... 15/176.4; 15/145; 15/106; 15/160; 15/DIG. 5; 15/DIG. 6; 403/263
[58] Field of Search ........... 15/176, 145, 106, DIG. 5, 15/DIG. 6, 160; 403/240, 247, 253, 263

[56] References Cited
U.S. PATENT DOCUMENTS
4,422,202 12/1983 Malvasio ...................... 15/DIG. 6
4,730,361 3/1988 Koffler ........................... 15/160

FOREIGN PATENT DOCUMENTS
2655930 6/1978 Fed. Rep. of Germany ........ 15/160
292031 10/1953 Switzerland ......................... 15/145
5293 12/1891 United Kingdom .................. 15/160
2859 11/1961 United Kingdom .................. 15/106

Primary Examiner—Peter Feldman
Attorney, Agent, or Firm—Browdy and Neimark

[57] ABSTRACT

A cleaning tool with a bristle body has bristle sets on its underside. On its top side a handle is removably fixed. In order to attain a varied use of cleaning tool, less weight of the bristle body and a simple fastening of the handle, the bristle body has a hollow chamber extending over its length, which is opened in the area of its top side by a continuous slit. Furthermore the handle attachment has a clamping piece disposed in the hollow chamber and at least partially adapted to its cross section, which is connected with the handle by means of a threaded pin extending through the slit.

13 Claims, 3 Drawing Sheets

CLEANING TOOL

BACKGROUND OF THE INVENTION

1. Field of the Invention

The invention relates to a cleaning tool with a bristle body on the underside of which a bristle set is fixed and on the top side of which a handle is removably fixed.

2. The Prior Art

It is known from German Laid-open Patent Application DE-OS No. 26 45 255 to fix a handle support on the bristle body of a scrub brush, broom or the like in a manner such that it has two pincerlike protrusions which enter corresponding recesses extending crosswise to the longitudinal direction of the bristle body and are undercut dovetail-like. The handle is pressed against the top side of the bristle body by this support and the entire handle support is removably fixed to the bristle body.

A cylinder-shaped brush is known from German Laid-open Patent Application DE-OS No. 20 46 347, having an extruded pipe-shaped hollow body with an undercut slit in which is fastened, by means of corresponding locking strips, a separate bristle carrier to be laid around the hollow body.

From German Utility Model DE-GM No. 85 02 549 is known a round headed brush made of plastic, for example a toilet brush, a bottle brush, a hair brush, a carpet beater roller or the like, the center area of which is in the form of a pipe and has a one piece end section in the form of a handle. The pipe is closed at the other end. Bristle bundles are welded and/or fastened by injection to the pipe section and, if required, to an end piece.

It is known from German Laid-open Patent Application DE-OS No. 35 01 098 to extrude hollow bristle bodies.

SUMMARY OF THE INVENTION

It is an object of the present invention to design a cleaning tool, for example a broom or scrub brush of the type according to the species such that a particularly simple fixing of the handle is attained, with the bristle body being usable in many ways and being particularly in light weight.

This object is attained by the invention in that the bristle body has a hollow chamber extending across its length which is open at the top in the form of a continuous slit and in that the handle attachment has a clamping piece disposed in the hollow chamber and at least partially adapted to its cross section, which is connected with the handle by a threaded pin extending through the slit. This results in the bristle body having an extraordinary light weight. The hollow chamber thus is used for weight savings on the one hand and, on the other, for receiving the clamping piece of a handle attachment which in this manner is disposed in a mostly unnoticeable manner in the hollow chamber. The handle can be attached at any place on the bristle body so that the bristle body can be brought into hard-to-reach places without being hampered by the handle. Additionally, because of the respective attachment of the handle at certain points, particularly great pressure can be applied to the floor at these points in a deliberate manner.

The design of the bristle body with thin-walled sections, on which the clamping piece abuts and which define the slit, results in the support body being particularly slim at those places where the material is not required and in being able to make the threaded pin of the handle attachment relatively short.

A particularly great advantage of the invention resides in that the bristle body can be extruded from plastic. If, on the one hand, the underside of the bristle body is in the form of a partial cylinder and if, on the other hand, the free ends of adjacent bristle bundles—in relation to the cross section of the bristle body—are disposed in a generally level plane, it is assured that the free ends of all bristle bundles rest on the floor without individual bristle bundles being deformed. On the other hand, the individual bristle bundles are of different length because of the partially cylindrical surface of the bristle body, they are particularly short in the central section, and in the section of the scrub brush which is in front or in back, relative to the direction of movement, they are longer. Because of this the central bristle bundles are stiffer and are primarily used to loosen the dirt from the floor, while the bristle bundles located at the front or back in relation to the movement are primarily used to move the loose or loosened dirt.

It is of particular advantage in the design according to the invention that the bristle body is equipped with two sets of bristle bundles, the free ends of which are defined by two level surfaces, the line of intersection of which extends parallel to the surface of the bristle body, it being possible to arrange this line of intersection symmetrically or asymmetrically. Because of this design the broom or scrub brush assumes the shape of a roof in the area of the free ends of its bundles of bristles, i.e., it can be inserted in two directions. For this reason the two sets of bristle bundles preferably are made of bristle bundles of differing stiffness and, if required, different length.

If the free ends of bristle bundles adjoining each other—in relation to the cross section of the bristle body—are disposed on the surface of a cylinder section which is concentric towards the underside, splattering of the dirt on the one hand and, on the other hand, sticking together of, in particular, the central bristle bundles being used can be avoided.

BRIEF DESCRIPTION OF THE DRAWINGS

Further advantages and characteristics of the invention ensue from the following description of exemplary embodiments in connection with the drawings, in which.

DETAILED DESCRIPTION OF THE PREFERRED EMBODIMENTS

Figure 1:
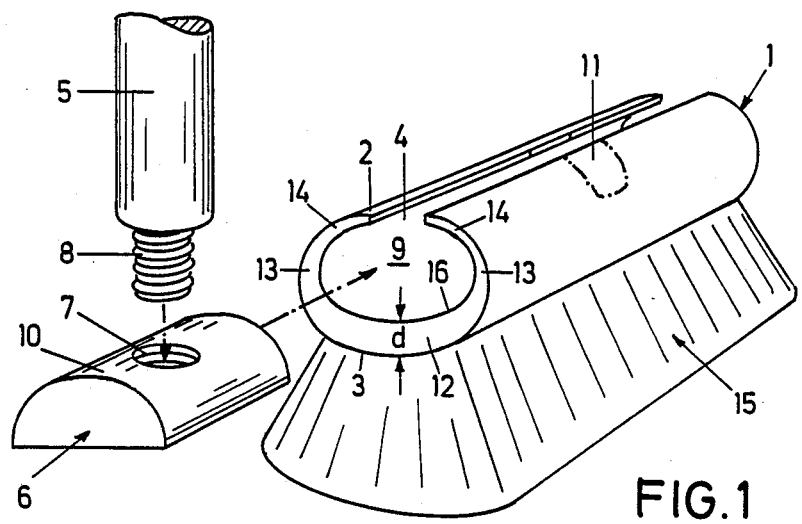
FIG. 1 is an exploded perspective view of a broom.

As can be seen from FIG. 1, a broom or a scrub brush is comprised of a hollow bristle body 1, the outer cross section of which—as shown in FIG. 1—may be slightly elliptical. The two less curved sides correspond to the top side 2 and the underside 3. A continuous slit 4 for receiving a handle 5 is provided in the center on the top side 2. A clamping piece 6, having a threaded bore 7, is provided for securing the handle. On its correlated end the handle 5 is provided with a threaded pin 8, adapted to the threaded bore 7, permanently lightly screwed into the threaded bore 7 and preferably connected with the clamping piece 6 in an undetachable manner. To fasten the handle 5 on the bristle body 1, the handle 5, together with the already lightly screwed-on clamping piece 6, is laterally slid on the bristle body 1 such that the clamping piece 6 enters its hollow chamber 9 while the handle is disposed outside of the bristle body 1 possible. The threaded pin 8 extends through the slit 4. Since the top side 10 of the clamping piece 6 is adapted to the interior shape of the bristle body 1 in the area of the slit 4 and since the clamping piece 6 is of sufficient length, it cannot twist when the handle 5 is screwed into place; securing of the handle 5 on the bristle body 1 therefore is only by screwing the handle 5 into the clamping piece 6. Since the slit 4 extends across the full length of the bristle body 1, the handle 5 can be secured at any desired place on the bristle body 1 in a longitudinal direction. Moving the handle 5 is also possible in a simple way. In order to make different inclined positions of the handle 5 in relation to the bristle body 1 possible, a lateral slit 11 may extend from the longitudinally extending slit 4, so that the handle 5 can also be attached to the bristle body 1 at an angle in relation to its normal position.

In the area of its top side 2 the bristle body 1 has relatively thin walls, while in the area of its underside 3 its has a thick-walled section 12 which in its lateral areas 13 transitions into the thin-walled sections 14 which extend as far as the slit 4. The thick-walled section 12 is located in that area where the bristle body 1 is provided with a bristle set 15. This thick-walled section 12 has a thickness d sufficient for mounting in the customary manner of the bristle set 15 by punching it into respective blind bores without perforating the inner wall 16 of the bristle body 1, which defines the hollow chamber 9, when the respective tufts of bristles are being punched in. As already mentioned, the handle 5 can be connected to the bristle body 1 at any desired place along the slit 4. If, for example, the handle 5 is fastened in the area of the end of the bristle body 1, it is possible, for example, to sweep or scrub corners with great force with this end. On the other hand, the freely extending end of the bristle body 1 can be used particularly well for sweeping under beds, cabinets or the like. Movement of the handle 5 in relation to the bristle body 1 becomes possible with a slight loosening by turning of the handle 5 in relation to the bristle body 1.

Even though the bristle body 1 has the thin-walled sections 14 in the area of its top side 2, it is very stiff, since the thick-walled section 12 prevents an opening of the slit 4 because of outwardly bending of the lateral areas 13 with the thin-walled section 14.

Figure 2:
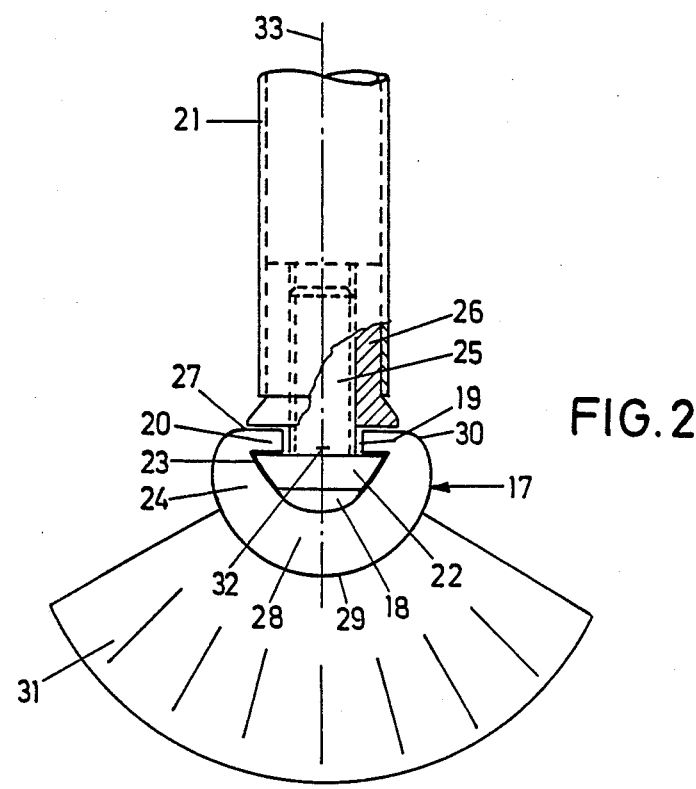
FIG. 2 is a cross section of a particularly preferred embodiment of a broom according to the present invention.

The exemplary embodiment in accordance with FIG. 2 differs from the previous one in that a hollow chamber 18 with an approximately triangular cross section is provided in a hollow body 17, the base line of this triangle being formed by thin-walled sections 20 which extend inwardly to a central slit 19, which they define. An associated handle 21 is provided with a clamping piece 22 having an approximately trapezoid cross section which abuts against the inner wall 23 of the bristle body 17 defining the hollow chamber 18 in the area of the thin-walled sections 20 and the central lateral areas 24, while the lower area of the hollow chamber 18 is not filled up by the clamping piece 22. In the area previously discussed, the trapezoidal cross section of the clamping piece 22 approximately corresponds to the associated cross section of the hollow chamber 18. A threaded pin 25 is formed in one piece on the clamping piece 22 and connects with a corresponding threaded sleeve 26 of the handle 21. The threaded sleeve 26 abuts on a flat contact surface 27 of the bristle body 17 formed on the thin-walled sections 20.

A thick-walled section 28 of the bristle body 17 upwardly extends from the underside 29 across the lateral areas 24 such that the thin-walled sections 20 extend inwardly only in the area of the top side 30. For this reason it is possible to install bristle sets 31 over a large angular area of approximately 120° which permits the asymmetric construction of the bristle set 31.

The underside 29 forming a surface of the bristle body 17 is in the shape of a partial circular cylinder. A central longitudinal axis 32 is assigned to it. Furthermore, the bristle body 17 is constructed symmetrically in respect to a plane of symmetry 33 in which the axis of the handle 21 also lies.

The bristle bodies 1, 17 are manufactured by extrusion as continuous pieces, i.e. the individual bristle bodies are sawed or cut from the continuously extruded piece.

The bristle bodies and handles, including their fastening on the bristle bodies, shown in the further exemplary embodiments are identical to the structure in accordance with FIG. 2, therefore identical reference numerals have been used below and no new description is provided.

Figure 3:
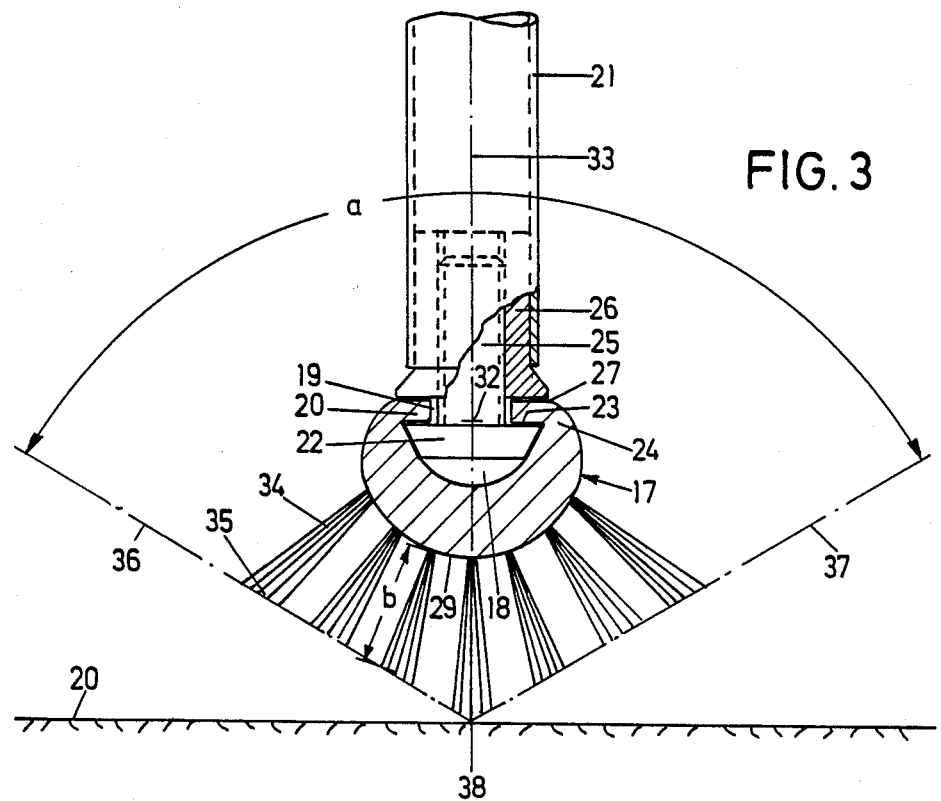
FIG. 3 is a cross-sectional view of a scrub brush with handle.

FIG. 3 shows a scrub brush with a bristle set of relatively hard and short bristle bundles 34. The free ends 35 of the bristle bundles 34 are located on two planes 36, 37, the line of intersection 38 of which extends parallel to the axis 32 and is located in the plane of symmetry 33. Thus the bristle bundles 34 are also—with respect to the cross sectional plane shown in the drawings—symmetrically disposed in relation to the plane of symmetry 33. The two planes 36, 37 include an angle a which lies between 100° and 130°. When the bristle bundles 34 associated with one of the two planes 36 or 37 rest on the floor 39, the plane of symmetry 33 is inclined by from 25° to 40° in relation to the vertical. This corresponds to the inclination which normally is generated by the user during application of the scrub brush. The length b of the bristles or bristle bundles 34 is between 15 mm and 23 mm for the shortest bristles and between 19 mm and 28 mm for the longest bristles.

Figure 4:
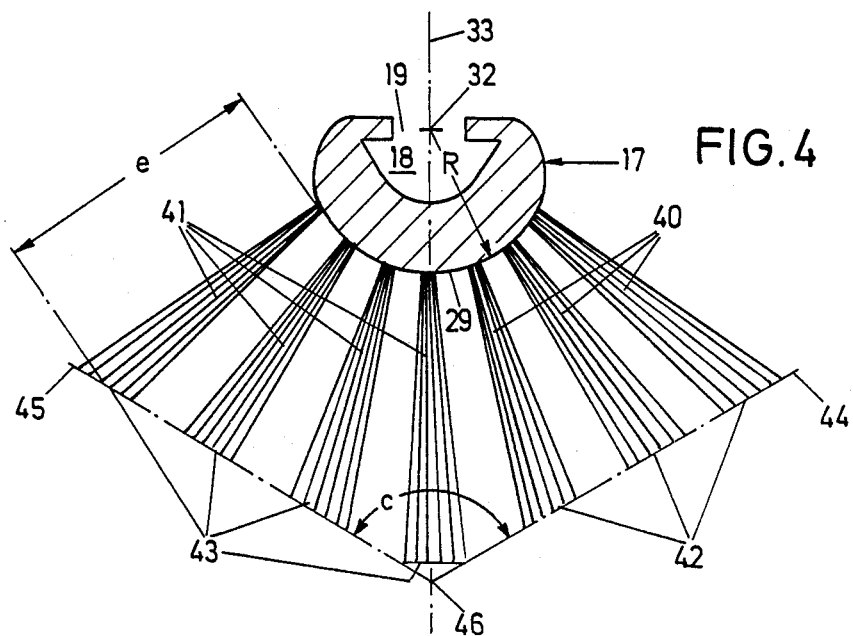
FIG. 4 is a cross-sectional view of a broom.

In FIG. 4 a broom is shown which is equipped with two sets of bristle bundles 40, 41, namely a smaller number of stiffer bristle bundles 40 and a larger number of softer bristle bundles 41. Here, too, the free ends 42, 43 of each set of bristle bundles are in general located on a level plane 44 or 45, the lines of intersection 46 of which is again intersected by the plane of symmetry 33 in the embodiment in accordance with FIG. 4. In the same way as for the scrub brushes it is true for the angle c enclosed by the planes 44, 45 that it is in the range of 100° to 130°. The length e of the shortest bristle bundles of brooms is in the range of from 37 mm to 41 mm and of the longest bristle bundles in the range of from 40 mm to 52 mm.

The radius R of the partial circular cylindrical underside 29 of the bristle body 1 is between 18 mm and 25 mm.

Since the free ends of the bristle bundles which are being used are located in a generally level plane and since the underside 29 of the bristle body 17 supporting the corresponding set of bristle bundles is radially penetrated by the bristle bundles, the outer bristle bundles of a set of bristle bundles used are longer and the inner ones are shorter. This results in particularly good cleaning action, because the inner bristle bundles loosen the dirt more and the outer bristle bundles move the loosened dirt along.

Figure 5:
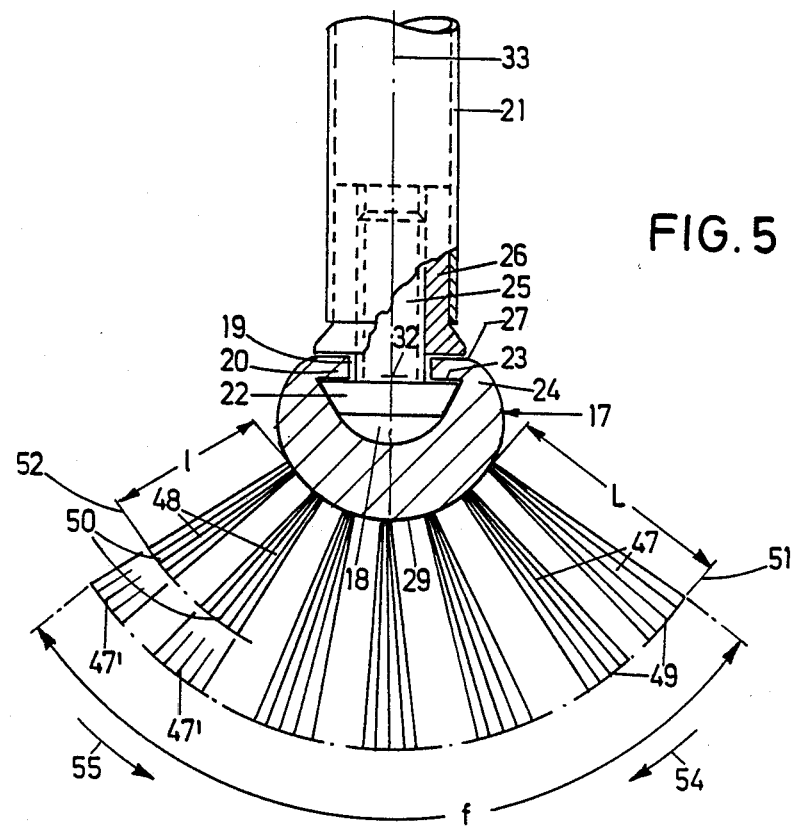
FIG. 5 is a cross-sectional view of a broom in accordance another embodiment of the present invention.
Figure 6:
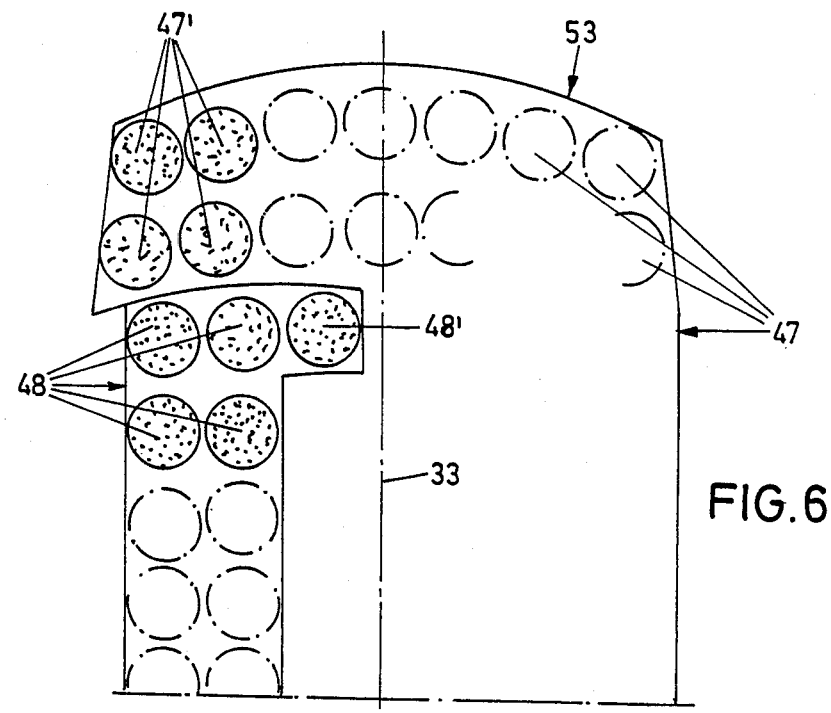
FIG. 6 is a plan view of the bristles according to FIG. 5.

In the exemplary embodiment in accordance with FIGS. 5 and 6, too, all bristle bundles 47, 48 are disposed radially in relation to the central longitudinal axis 32 and are secured in the customary way, for example by punching, in the area of the bristle body 17 between the underside 29, forming a partial circular cylindrical surface, and the inner wall 23 of the hollow body 18 in the bristle body 17.

As shown in FIGS. 5 and 6, the bristle body 17 in its entirety is provided with a bristle set which is disposed symmetrically in relation to the plane of symmetry 33.

The underside 29 is equipped across approximately ⅔ of its circumference visible in cross section with softer and, as a rule longer bristle bundles 47 and across a smaller area of the circumference, i.e. the remaining ⅓, with stiffer, as a rule shorter bristle bundles 48, as shown in FIG. 5, where a total of seven rows of bristle bundles is shown, five rows of which are formed by longer, softer bristle bundles 47 and two rows by shorter, stiffer bristle bundles 48.

Also as shown in FIG. 5 the bristle bundles 47 as well as the bristle bundles 48 are located with their respective ends 49 and 50 on segments of circular cylinders 51, 52 which are concentric to the central longitudinal axis 32.

The free length L of the softer bristle bundles 47 is 45 mm to 50 mm. It is true for the free length l of the stiffer bristle bundles 48 that 0.8 L <1>0.95 L. It is true for the opening angle f of the entire bristle set that 90° and 120°.

As further shown in FIGS. 5 and 6, a few longer, soft bristle bundles 47' are provided in the area of the front faces 53 of the bristle body 17, as well as in the area of the shorter, stiffer bristle bundles 48, which are intended to prevent an escape to the side of the dirt loosened by the shorter, stiffer bristles during sweeping. The bristle bundle 48', only shown in FIG. 6, of shorter, stiffer bristle bundles in the first row made of longer, soft bristle bundles 47 adjacent to the shorter bristle bundles 48 is used for supporting these bristle bundles 47 in the area of the front faces 53.

The broom shown in FIGS. 5 and 6 is a so-called combination broom, i.e. it can be used for two different purposes. It can be used with a handle 21 by a standing person as a broom for sweeping a room. The longer bristle bundles 47 are used for sweeping flat surfaces in the house. The arrow in FIG. 5 indicating the direction of sweeping 54 also indicates that brooms normally are used with a plane of symmetry 33 inclined from the vertical. The shorter, stiff bristles 48 are not used in this mode.

However, the shorter, stiff bristles 48 are used in the direction of operation 55 for the sweeping of carpets and straightening out carpet fringes. In this case it is not desirable for the longer, softer bristles 47 to be used to a large extent.

In the same way these brooms, when made correspondingly smaller and having a shorter handle, can be used as hand brooms, for example for the successive pre-cleaning and polishing of shoes, for the interior of automobiles and the like.

While the longer, softer bristle bundles 41, 47, 47' consist of pure horsehair or fine hair made of plastic or of a mixture of horsehair and fine hair made of plastic, the shorter, stiff bristle bundles 34, 40, 48, 48' always are bristles of plastic.

In accordance with the view in FIG. 5, all bristle bundles 47, 48, 47', 48' may be of the same length, so that they all are located on the cylinder section plane 51 and are only different in stiffness.

The stiff bristles may have a diameter of from 0.6 mm to 1.2 mm. The soft bristles have a diameter of from 0.2 mm to 0.35 mm.

The bristle bodies 1, 17 are extruded from polyethylene.

Polypropylene, polyvinyl chloride or polyamide is used as material for the bristles.

It should be understood that the foregoing exemplary embodiment are given by way of example only and that further variants and improvements are possible within the scope of the invention.

What is claimed is:

1. A cleaning tool comprising:
   a bristle body having a bristle set fixed on an underside thereof;
   a handle removably fixed on top thereof, said bristle body comprising a hollow chamber extending across its length which is open in the area of the top side in the form of a continuous slit; and
   a handle attachment having a clamping piece disposed in said hollow chamber and at least partially adapted to its cross section, which is connected with said handle by a threaded pin extending through the slit.

2. The cleaning tool in accordance with claim 1, wherein said bristle body consists of thin-walled sections at least in the areas of a top side defining the continuous slit, and said clamping piece abuts at least against an inner wall of said thin-walled sections.

3. The cleaning took in accordance with claim 1, wherein said bristle body is extruded from plastic.

4. The cleaning tool plastic in accordance with claim 1, wherein said hollow chamber is approximately in the form of a triangle and said clamping piece is approximately trapezoid.

5. The cleaning took in accordance with claim 1, wherein said bristle body is equipped with a plurality of different bristle sets.

6. The cleaning took in accordance with claim 1, wherein the underside of the bristle body is in the form of a partial circular cylinder.

7. The cleaning took in accordance with claim 1, wherein free ends of adjacent bristle bundles with respect to the cross section of the bristle body are disposed in a substantially level plane.

8. The cleaning tool in accordance with claim 7, wherein the level plan includes an angle of approximately 50° to 65° with respect to the handle.

9. The cleaning tool in accordance with claim 1, wherein the bristle bundles are disposed normally with respect to the underside of said bristle body.

10. The cleaning tool in accordance with claim 1, wherein said bristle body is equipped with two sets of bristle bundles, the free ends of which are defined by two level surfaces, the lines of intersection of which extends parallel to the underside of said bristle body.

11. The cleaning took in accordance with claim 1, wherein the free ends of adjacent bristle bundles with respect to the cross section of the said bristle body are disposed on a cylinder section plan which is concentric to the underside.

12. The cleaning tool in accordance with claim 1, wherein said bristle body is equipped with two sets of bristle bundles of different length, the free ends of which are defined by cylinder section planes having shorter bristle bundles consisting of stiffer bristles and longer bristle bundles consisting of softer bristles.

13. The cleaning tool in accordance with claim 1, wherein bristle body is equipped with two sets of bristle bundles of differing stiffness.

* * * * *